No. 855,094. PATENTED MAY 28, 1907.
J. J. BUSENBENZ.
GAS MANUFACTURING PROCESS.
APPLICATION FILED MAY 26, 1906.
2 SHEETS—SHEET 1.
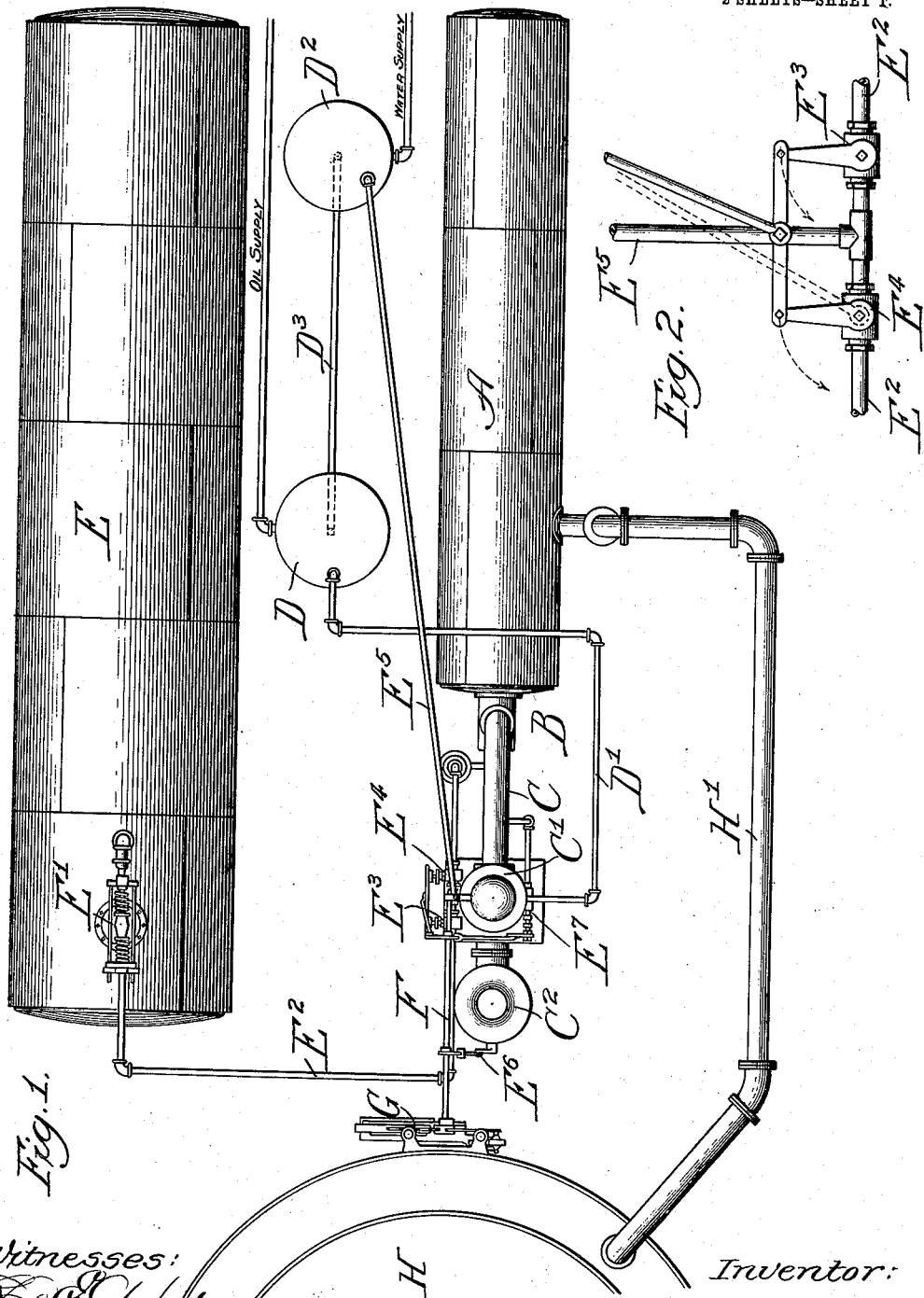

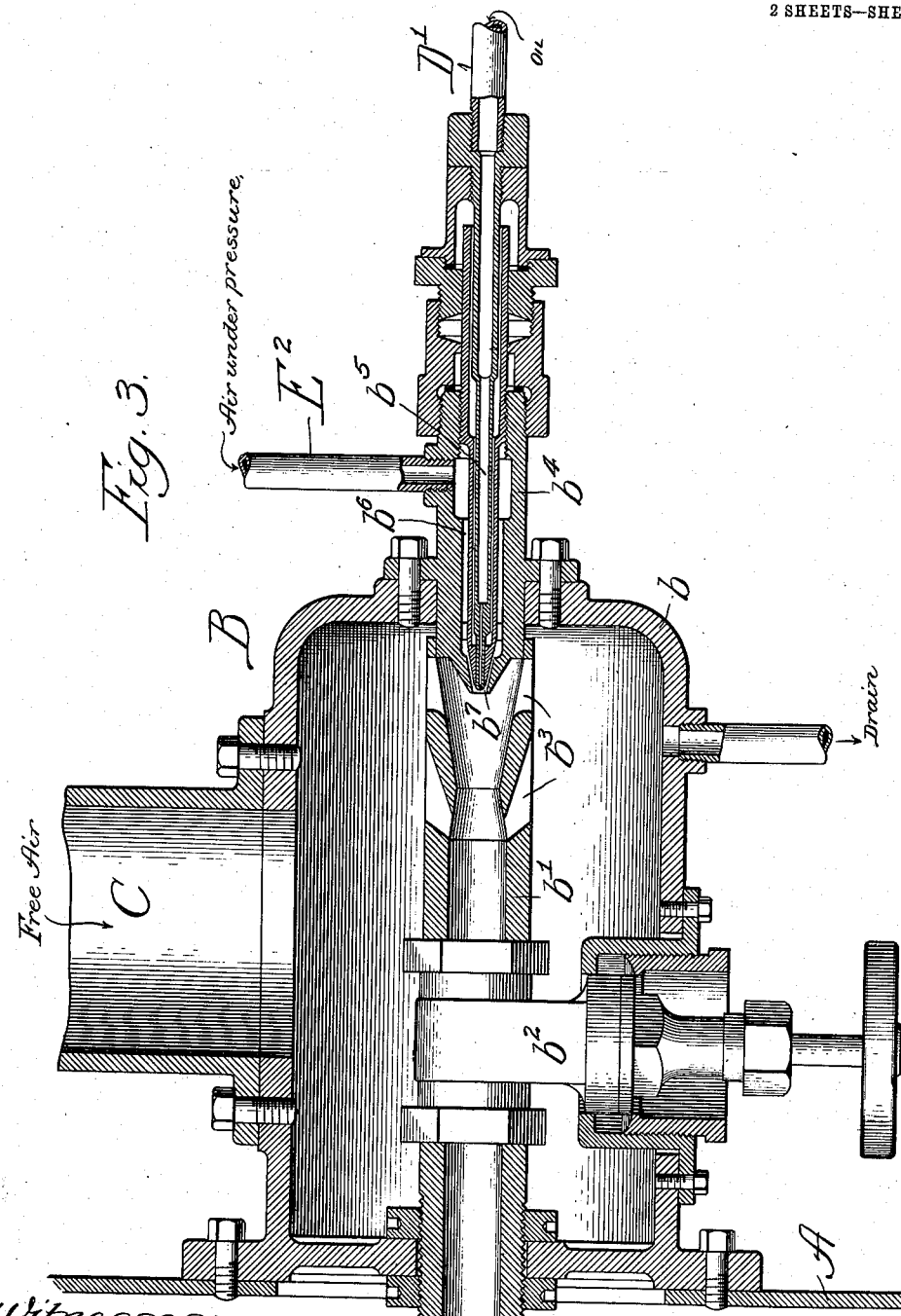

UNITED STATES PATENT OFFICE.

JACOB J. BUSENBENZ, OF CHICAGO, ILLINOIS, ASSIGNOR TO INDUSTRIAL GAS CONSTRUCTION CO., OF CHICAGO, ILLINOIS, A CORPORATION OF ILLINOIS.

GAS-MANUFACTURING PROCESS.

No. 855,094.   Specification of Letters Patent.   Patented May 28, 1907.

Application filed May 26, 1906. Serial No. 381,828.

*To all whom it may concern:*

Be it known that I, JACOB J. BUSENBENZ, a citizen of the United States, residing at Chicago, in the county of Cook and State of Illinois, have invented a new and useful Gas-Manufacturing Process, of which the following is a specification.

My invention relates particularly to processes for manufacturing a stable gas without the use of heat from volatile carbonaceous liquid, such as gasolene, alcohol, or the like.

My primary object is to simplify, cheapen and improve the process of manufacturing a stable gas from volatile liquid fuels, such, for instance, as those enumerated above.

The accompanying drawings illustrate diagrammatically apparatus well adapted to the purpose of carrying out my improved process.

Figure 1 represents diagrammatically complete apparatus usefully employed in the practice of my improved process; Fig. 2, a broken elevational view showing a detail of certain valves employed; and Fig. 3, an enlarged sectional detail view of an injector employed in connection with the mixer-chamber shown in Fig. 1.

A represents a mixer chamber; B, an injector; C, an air-conduit connecting with a stand-pipe $C^1$ provided with an air-intake $C^2$, through which air is drawn in from the external atmosphere; D, a supply tank for volatile liquid, such as gasolene, from which the oil passes through a pipe $D^1$ to the injector; $D^2$, a water-tank connected by a pipe $D^3$ with the tank D and serving to displace the oil therein; E, a compressed-air tank from which air is taken through a pressure-reducing valve $E^1$ and a pipe $E^2$ to the injector; $E^3$, $E^4$, a pair of valves (Fig. 2) connected with the pipe $E^2$; $E^5$, a pipe connecting the pipe $E^2$ at a point between the valves $E^3$ $E^4$ with the hydraulic tank $D^2$; $E^6$, a valve controlling the air-intake $C^2$; $E^7$, a valve controlling the admission of oil to the injector; F, a rock-shaft connected with the valves $E^3$, $E^4$, $E^6$ and $E^7$ and controlling the admission of air under pressure, oil under pressure and atmospheric air to the injector; G, mechanism connected with the gasometer for automatically actuating the rock-shaft F in one direction to close said valves when the gasometer reaches the upper end of its traverse and to open said valves when the gasometer reaches the lower end of its traverse; and H, the gasometer connected by a pipe $H^1$ with the mixer tank A.

The details of the apparatus need not be described, except to such extent as will render the process more readily understood. The mixer tank A has connected with it the casing $b$ of the injector B. The conduit C through which air is drawn by induction from the external atmosphere, when the valve $E^6$ is open, connects with the top of the casing $b$. Within the casing $b$ is an injector tube $b^1$ whose passage is controlled by a gate-valve $b^2$. The outer end of the tube $b^1$ is provided with air-inlets $b^3$. Connected with the outer end of the casing is the injector nozzle $b^4$, which has an inner passage $b^5$ in communication with the oil-pipe $D^1$ and an outer annular passage $b^6$ which is in communication with the air-pipe $E^2$. The inner end of the nozzle enters the outer end of the tube $b^1$. The annular air-passage $b^6$ tapers or converges, as indicated at $b^7$, so that the oil under pressure and the air under pressure enter in atomizing relation into the tube $b^1$ and the mixer chamber, and a sufficient quantity of air is drawn in from the external atmosphere through the conduit C to give the proper proportions to the mixture and form a stable gas.

It will be noted that a constant common pressure is maintained upon the oil and air passing through the nozzle of the injector, the source of supply of the pressure being the compressed-air tank E and the reducing valve $E^1$, a portion of the air passing directly to the nozzle of the injector and a portion passing through the pipe $E^5$ to the water-tank $D^2$, where it displaces the water, causing the latter to displace the oil in the tank D. The process is carried on without the use of heat, and practical experience has demonstrated that a stable gas adapted to use in cold, as well as warm, climates, is produced. It will be understood that as the gasometer rises, the pressure in the mixer-chamber is maintained at a substantially uniform amount, the small variation in pressure being insufficient to affect the operation.

The improved process renders unnecessary the use of retorts or the application of heat from extraneous sources to the oil or vapor at any point. Moreover, the apparatus herein briefly described (but not claimed) and more fully set forth in my application No. 318,825, of even date herewith, is adapted to continuous carrying on of the process with little care on the part of the attendant. It may be added that the corresponding pressures upon the oil and air passing through the nozzle of the injector are proportioned according to the relative dimensions of the passages, common (same) pressure for the oil and air being proper when the passages are proportioned as shown.

What I regard as new, and desire to secure by Letters Patent, is—

1. The process of manufacturing a stable gas from a volatile liquid without the use of heat, which consists in injecting air and volatile liquid in atomizing relationship into an unheated mixer-chamber, and employing an induced flow of external atmosphere to complete the proper proportion of air in the mixture.

2. The process of manufacturing a stable gas from a volatile liquid without the use of heat, which consists in forcing volatile liquid and air under corresponding pressure into an unheated mixer-chamber and inducing such flow of external atmosphere into the mixer-chamber as is necessary to complete the proper proportion of air in the mixture.

3. The process of manufacturing and storing a stable gas, which consists in injecting air and oil in a common direction and under a common uniform pressure into a mixer-chamber, inducing a flow of external air to complete the proper proportion of air in the mixture, and maintaining a substantially uniform pressure in the mixer-chamber.

JACOB J. BUSENBENZ.

In presence of—
L. HEISLAR,
J. H. LANDES.